United States Patent
Xie et al.

(10) Patent No.: US 9,794,090 B2
(45) Date of Patent: Oct. 17, 2017

(54) TRANSMITTER AND INTERFERENCE CANCELLATION METHOD

(71) Applicant: Huawei Technologies Co., Ltd., Shenzhen (CN)

(72) Inventors: Huan Xie, Shanghai (CN); Xiaomin Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/398,499

(22) Filed: Jan. 4, 2017

(65) Prior Publication Data
US 2017/0118047 A1   Apr. 27, 2017

Related U.S. Application Data

(63) Continuation of application No. PCT/CN2014/083574, filed on Aug. 1, 2014.

(51) Int. Cl.
*H04L 25/49* (2006.01)
*H04L 25/03* (2006.01)
*H04B 1/04* (2006.01)

(52) U.S. Cl.
CPC .. *H04L 25/03343* (2013.01); *H04L 25/03847* (2013.01); *H04L 25/49* (2013.01); *H04B 2001/0425* (2013.01)

(58) Field of Classification Search
CPC ..... H03F 1/26; H03F 1/32; H03F 3/12; H03F 3/21; H03F 1/3247; H04B 1/04;
(Continued)

(56) References Cited

U.S. PATENT DOCUMENTS

| | | | |
|---|---|---|---|
| 8,699,620 B1 * | 4/2014 | Wu | H03F 1/3247 375/254 |
| 8,718,178 B1 * | 5/2014 | Carbone | H03D 1/04 375/285 |

(Continued)

FOREIGN PATENT DOCUMENTS

| | | |
|---|---|---|
| CN | 101110571 A | 1/2008 |
| CN | 101534133 A | 9/2009 |

(Continued)

OTHER PUBLICATIONS

Ahn et al., "Compensation for Power Amplifier Nonlinearity in the Presence of Local Oscillator Coupling Effects," IEEE Communications Letters, vol. 16, Issue 5, pp. 600-603, Institute of Electrical and Electronics Engineers, New York, New York (May 2012).

*Primary Examiner* — Shawkat M Ali
(74) *Attorney, Agent, or Firm* — Leydig, Voit & Mayer, Ltd.

(57) ABSTRACT

Present application provides embodiments of a transmitter and an interference cancellation method. The transmitter includes: a first digital predistorter (DPD), a power amplifier (PA), and a first processor located on a feedback channel of the transmitter and separately connected to the PA and the first DPD. The first processor performs, according to a feedback cancellation signal, interference cancellation on a signal of the feedback channel, to acquire a first mixed signal, and sends the first mixed signal to the first DPD. The first DPD is configured to perform linear predistortion processing according to a first baseband signal on a first transmit channel and the first mixed signal, to generate a first predistortion signal. The PA is configured to amplify and then transmit a to-be-transmitted signal using an antenna.

(Continued)

The to-be-transmitted signal is the first predistortion signal or a signal obtained according to the first predistortion signal.

12 Claims, 7 Drawing Sheets

(58) Field of Classification Search
CPC ........ H04B 1/0475; H04K 1/02; H04L 25/02; H04L 25/03; H04L 25/03343; H04L 25/03847; H04L 25/49
USPC ...................... 330/2; 375/254, 296, 297, 324
See application file for complete search history.

(56) References Cited

U.S. PATENT DOCUMENTS

| | | | |
|---|---|---|---|
| 8,982,995 B1* | 3/2015 | Van Cai | H04B 1/0475 375/297 |
| 2002/0008777 A1 | 1/2002 | Ovadia et al. | |
| 2004/0246048 A1* | 12/2004 | Leyonhjelm | H03F 1/3247 330/2 |
| 2007/0142000 A1* | 6/2007 | Herzinger | H04B 1/04 455/91 |
| 2012/0069931 A1* | 3/2012 | Gandhi | H03F 1/3247 375/296 |
| 2012/0155572 A1* | 6/2012 | Kim | H03F 1/3247 375/297 |
| 2013/0010810 A1 | 1/2013 | Pelet | |
| 2013/0094610 A1* | 4/2013 | Ghannouchi | H03F 1/3247 375/296 |
| 2014/0050282 A1* | 2/2014 | Watanabe | H03F 1/3247 375/296 |
| 2015/0049841 A1* | 2/2015 | Laporte | H03F 1/3247 375/297 |
| 2015/0103952 A1* | 4/2015 | Wang | H04L 27/368 375/297 |
| 2015/0270857 A1 | 9/2015 | Li et al. | |
| 2016/0006404 A1* | 1/2016 | Liu | H03F 1/0261 330/9 |

FOREIGN PATENT DOCUMENTS

| | | |
|---|---|---|
| CN | 102098247 A | 6/2011 |
| CN | 102143108 A | 8/2011 |
| CN | 103001900 A | 3/2013 |
| EP | 2654210 A1 | 10/2013 |
| WO | WO 2008102943 A1 | 8/2008 |

* cited by examiner

TRANSMITTER AND INTERFERENCE CANCELLATION METHOD

CROSS-REFERENCE TO RELATED APPLICATIONS

This application is a continuation of International Application No. PCT/CN2014/083574, filed on Aug. 1, 2014, the disclosure of which is hereby incorporated by reference in its entirety.

TECHNICAL FIELD

Embodiments of the present invention relate to communications technologies, and in particular, to a transmitter and an interference cancellation method.

BACKGROUND

To improve transmission performance of a link and throughput of a communications system, a multiple-input multiple-output (MIMO) technology becomes one of key technologies in the field of wireless communications. As the MIMO technology continuously develops in recent years, the MIMO technology will be more widely applied in various wireless communications systems.

In the MIMO technology, a transmitter in use usually includes multiple transmit channels and one feedback channel. The transmit channels in the transmitter are separated in a space shielding manner such as cavity separating or increasing a physical distance, so as to reduce interference among the transmit channels. However, a signal of the transmit channel may leak to the feedback channel, that is, the signal in the transmit channel may interfere with the feedback channel, and an interference signal on the feedback channel may interfere with the transmit channel, thereby leading to distortion of a transmit signal.

SUMMARY

Embodiments of the present invention provide a transmitter and an interference cancellation method, so as to solve a problem in the prior art that distortion of a transmit signal is easily caused.

According to a first aspect, the embodiments of the present invention provide a transmitter, including: a feedback cancellation module, a first digital predistorter (DPD) and a power amplifier (PA). where the first DPD and the PA are located on a first transmit channel of the transmitter, and the first DPD is connected to the PA; the feedback cancellation module is located on a feedback channel of the transmitter, and the feedback cancellation module is separately connected to the PA and the first DPD, where the feedback cancellation module is configured to perform, according to a feedback cancellation signal, interference cancellation on a signal of the feedback channel, to obtain a first mixed signal, and send the first mixed signal to the first DPD, where the feedback cancellation signal is a signal obtained according to a feedback interference signal that is collected when the feedback channel is in an idle state;

the first DPD is configured to perform linear predistortion processing according to a first baseband signal on the first transmit channel and the first mixed signal, to generate a first predistortion signal; and the PA is configured to amplify a to-be-transmitted signal and then transmit the signal by using an antenna, where the to-be-transmitted signal is the first predistortion signal or a signal obtained according to the first predistortion signal.

According to the first aspect, in a first possible implementation manner of the first aspect, the transmitter further includes a control switch; the feedback cancellation module is connected to the PA through the control switch, and a status of the control switch includes being connected to the PA; and the feedback cancellation module is specifically configured to: when the control switch is connected to the PA, acquire the signal of the feedback channel, perform, according to the feedback cancellation signal, interference cancellation on the signal of the feedback channel, to obtain the first mixed signal, and send the first mixed signal to the first DPD.

According to the first possible implementation manner of the first aspect, in a second possible implementation manner, the status of the control switch further includes grounded or floating, and when the status of the control switch is grounded or floating, the feedback channel is in the idle state; and the feedback cancellation module is further configured to: when the status of the control switch is grounded or floating, acquire the feedback cancellation signal by collecting the feedback interference signal of the feedback channel.

According to the first possible implementation manner of the first aspect, in a third possible implementation manner, the status of the control switch further includes grounded or floating, and when the status of the control switch is grounded or floating, the feedback channel is in the idle state;

the first DPD is further configured to: before generating the first predistortion signal, perform linear predistortion on a baseband signal preceding the first baseband signal on the first transmit channel, to generate a second predistortion signal, and send the second predistortion signal to the feedback cancellation module; and the feedback cancellation module is further configured to: when the status of the control switch is grounded or floating, collect the feedback interference signal of the feedback channel, acquire a first parameter according to a correlation between the second predistortion signal sent by the first DPD and the feedback interference signal, and acquire the feedback cancellation signal according to the first parameter and the second predistortion signal.

According to the first aspect to the third possible implementation manner of the first aspect, in a fourth possible implementation manner, the transmitter further includes: a transmit cancellation module, the transmit cancellation module is located on the first transmit channel, and the first DPD is connected to the PA through the transmit cancellation module; and the transmit cancellation module is configured to perform, according to a first transmit cancellation signal, interference cancellation on the first predistortion signal generated by the first DPD, to obtain the to-be-transmitted signal, where the first transmit cancellation signal is a signal obtained according to an interference signal that is generated when the first transmit channel is interfered with by one or more other transmit channels except the first transmit channel in the transmitter.

According to the fourth possible implementation manner of the first aspect, in a fifth possible implementation manner, the transmit cancellation module is connected to the feedback cancellation module, the transmitter further includes a second DPD, the second DPD is located on a second transmit channel of the transmitter and is connected to the transmit cancellation module; the second transmit channel is any transmit channel except the first transmit channel in the transmitter;

the feedback cancellation module is further configured to send the first mixed signal to the transmit cancellation module; and the second DPD is configured to generate a predistortion signal according to a second baseband signal, and send the predistortion signal to the transmit cancellation module, where the second baseband signal is a baseband signal of the second transmit channel; and the transmit cancellation module is specifically configured to: before performing interference cancellation on the first predistortion signal according to the first transmit cancellation signal, acquire a second parameter according to a correlation between the first mixed signal sent by the feedback cancellation module and the predistortion signal generated by the second DPD, and acquire the first transmit cancellation signal according to the second parameter and the predistortion signal generated by the second DPD.

According to any one of the first aspect to the fourth possible implementation manner of the first aspect, in a sixth possible implementation manner, the transmitter further includes a transmit cancellation module, the transmit cancellation module is located on the first transmit channel, and the transmit cancellation module is connected to the PA through the first DPD; and the transmit cancellation module is configured to perform, according to a second transmit cancellation signal, interference cancellation on a third baseband signal on the first transmit channel, to obtain the first baseband signal, and send the first baseband signal to the first DPD, where the second transmit cancellation signal is a signal obtained according to an interference signal that is generated when the first transmit channel is interfered with by one or more other transmit channels except the first transmit channel in the transmitter.

According to the sixth possible implementation manner of the first aspect, in a seventh possible implementation manner, the transmit cancellation module is connected to the feedback cancellation module;

the feedback cancellation module is further configured to send the first mixed signal to the transmit cancellation module; and the transmit cancellation module is further configured to: before performing interference cancellation on the third baseband signal, acquire a third parameter according to a correlation between the first mixed signal sent by the feedback cancellation module and a second baseband signal, and acquire the second transmit cancellation signal according to the third parameter and the second baseband signal, where the second baseband signal is a baseband signal of a second transmit channel in the transmitter; and the second transmit channel is any transmit channel except the first transmit channel in the transmitter.

According to a second aspect, the embodiments of the present invention further provide an interference cancellation method, including:

when a feedback channel in a transmitter is connected to a first transmit channel in the transmitter, acquiring a signal of the feedback channel;

performing interference cancellation on the signal of the feedback channel according to a feedback cancellation signal, to obtain a first mixed signal, where the feedback cancellation signal is a signal obtained according to a feedback interference signal that is collected when the feedback channel is in an idle state;

performing linear predistortion processing according to a first baseband signal of the first transmit channel and the first mixed signal, to generate a first predistortion signal; and amplifying a to-be-transmitted signal and then transmitting the signal by using an antenna, where the to-be-transmitted signal is the first predistortion signal or a signal obtained according to the first predistortion signal.

According to the second aspect, in a first possible implementation manner of the second aspect, before the performing interference cancellation on the signal of the feedback channel according to a feedback cancellation signal, the method further includes:

when the feedback channel is in the idle state, acquiring the feedback cancellation signal by collecting the feedback interference signal of the feedback channel.

According to the second aspect or the first possible implementation manner of the second aspect, in a second possible implementation manner of the second aspect, before the performing interference cancellation on the signal of the feedback channel according to a feedback cancellation signal, the method further includes:

when the feedback channel is in the idle state, collecting the feedback interference signal of the feedback channel, and acquiring a first parameter according to a correlation between the feedback interference signal and a second predistortion signal; and acquiring the feedback cancellation signal according to the first parameter and the second predistortion signal, where the second predistortion signal is a predistortion signal that is generated by performing linear predistortion on a baseband signal preceding the first baseband signal transmitted on the first transmit channel.

According to any one of the second aspect to the second possible implementation manner of the second aspect, in a third possible implementation manner, the idle state includes: floating or grounded.

According to any one of the second aspect to the third possible implementation manner of the second aspect, in a fourth possible implementation manner, before the amplifying a to-be-transmitted signal and then transmitting the signal by using an antenna, the method further includes:

performing interference cancellation on the first predistortion signal according to a first transmit cancellation signal, to obtain the to-be-transmitted signal, where the first transmit cancellation signal is a signal obtained according to an interference signal that is generated when the first transmit channel is interfered with by a transmit channel except the first transmit channel in the transmitter.

According to the fourth possible implementation manner of the second aspect, in a fifth possible implementation manner, before the performing interference cancellation on the first predistortion signal according to a first transmit cancellation signal, the method further includes:

acquiring a second parameter according to a correlation between the first mixed signal and a predistortion signal generated in a second transmit channel; and acquiring the first transmit cancellation signal according to the second parameter and the predistortion signal generated in the second transmit channel, where the second transmit channel is any transmit channel except the first transmit channel in the transmitter.

According to any one of the second aspect to the third possible implementation manner of the second aspect, in a sixth possible implementation manner, before the performing linear predistortion processing according to a first baseband signal of the first transmit channel and the first mixed signal, the method further includes:

performing interference cancellation on a third baseband signal on the first transmit channel according to a second transmit cancellation signal, to obtain the first baseband signal; where the second transmit cancellation signal is a signal obtained according to an interference signal that is generated when the first transmit channel is interfered with by one or more other transmit channels except the first transmit channel in the transmitter.

According to the sixth possible implementation manner of the second aspect, in a seventh possible implementation manner, before the performing interference cancellation on a third baseband signal on the first transmit channel according to a second transmit cancellation signal, the method further includes:

acquiring a second parameter according to a correlation between the first mixed signal and a second baseband signal; and acquiring the second transmit cancellation signal according to the second parameter and the second baseband signal, where the second transmit channel is any transmit channel except the first transmit channel in the transmitter, and the second baseband signal is a baseband signal of the second transmit channel.

In the transmitter and the interference cancellation method provided in the embodiments of the present invention, before a first DPD performs linear predistortion processing, a feedback cancellation module is used to perform interference cancellation on a signal of a feedback channel according to a feedback cancellation signal; because the feedback cancellation signal is a signal obtained according to a feedback interference signal, so that an interference signal that the first transmit channel leaks to the feedback channel is canceled, thereby avoiding the feedback interference signal from interfering with the first transmit channel, and reducing distortion of a transmit signal on the first transmit channel.

A. BRIEF DESCRIPTION OF DRAWINGS

To describe the technical solutions in the embodiments of the present invention or in the prior art more clearly, the following briefly introduces the accompanying drawings required for describing the embodiments. The accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the embodiments of the present invention, a transmitter may be a transmitter of a network device or user equipment. The transmitter includes at least one transmit channel and at least one feedback channel. The feedback channel may be specifically a transmission channel formed by wired connection between an input end and an output end of the transmit channel, and is used for transmitting a feedback signal corresponding to the transmit channel.

Figure 1:
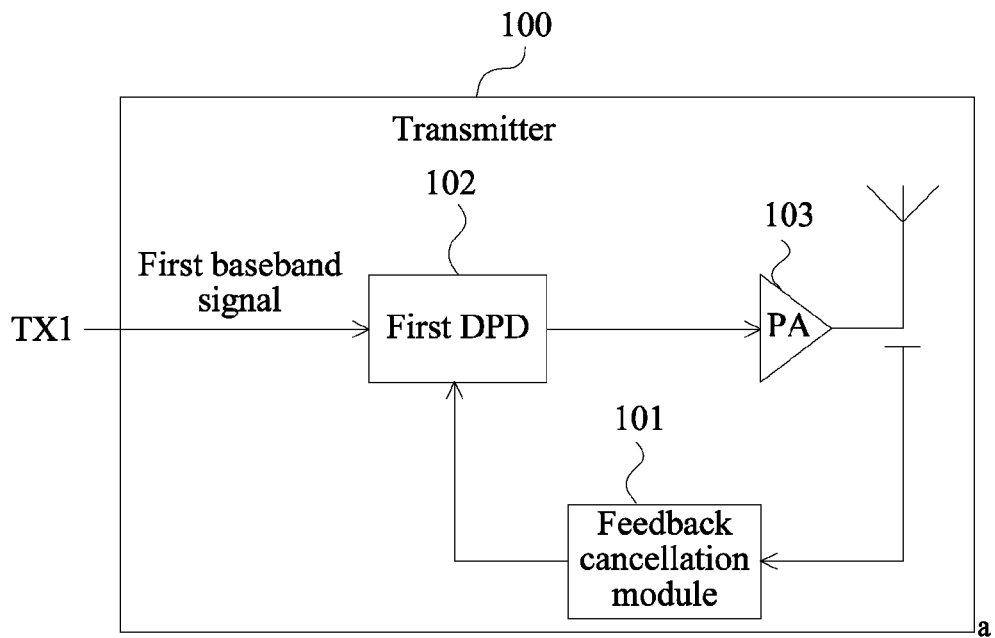
FIG. 1 is a schematic structural diagram of a transmitter according to Embodiment 1 of the present invention.

FIG. 1 is a schematic structural diagram of a transmitter according to Embodiment 1 of the present invention. A transmitter 100 includes: a feedback cancellation module 101, a first digital predistorter (DPD) 102 and a power amplifier (PA) 103. The first DPD 102 and the PA 103 are located on a first transmit channel TX1 of the transmitter 100, and the first DPD 102 is connected to the PA 103.

The feedback cancellation module 101 is located on a feedback channel of the transmitter 100, and the feedback cancellation module 101 is separately connected to the PA 103 and the first DPD 102.

The feedback cancellation module 101 is configured to perform, according to a feedback cancellation signal, interference cancellation on a signal of the feedback channel, to obtain a first fixed signal, and output the first mixed signal to the first DPD 102. The feedback cancellation signal is a signal obtained according to a feedback interference signal that is collected when the feedback channel is in an idle state.

The first DPD 102 is configured to perform linear predistortion processing according to a first baseband signal of the first transmit channel and the first mixed signal, to generate a first predistortion signal.

The PA 103 is configured to amplify a to-be-transmitted signal and then transmit the signal by using an antenna, where the to-be-transmitted signal is the first predistortion signal or a signal obtained according to the first predistortion signal.

Specifically, the transmitter includes one or more transmit channels. Because a processing principle for each transmit channel in the transmitter is the same, for ease of description, only interference cancellation for the first transmit channel in the transmitter is described below.

In a wireless communications system, to meet a signal transmission requirement, power needs to be amplified by the PA 103, so as to reach a corresponding signal power value. However, power amplification for a signal is usually performed in a nonlinear area of the PA 103. Nonlinearity of the nonlinear area generates distortion products such as harmonic distortion caused by amplitude distortion and phase amplitude, intermodulation distortion, and the like. Therefore, to avoid nonlinear distortion caused by power amplification in the transmit channel, a signal output by the PA 103 is usually fed back to the first DPD 102, and the first DPD 102 performs linear compensation by using a predistortion technology.

Optionally, because the signal on which the PA 103 has performed power amplification has large power, a coupler may be disposed so as to couple the signal output by the PA 103 to the feedback channel, to reduce signal power of the feedback channel, thereby reducing signal processing intensity of the feedback cancellation module and improving a processing speed.

Optionally, in a normal case, the PA 103 performs operation of power amplification on an analog signal, and the first DPD 102 performs linear optimization processing on a digital signal. Further, in the transmitter 100, the feedback channel may further include an analog to digital converter (ADC). The first DPD 102 and the PA 103 are connected through a digital to analog converter (DAC).

Specifically, the ADC may exist in the feedback channel in three different forms: In the first form, the ADC may be integrated in the feedback cancellation module 101 in a form of software/or hardware; in a second form, the ADC may be independent of the feedback cancellation module 101, and located between the PA 103 and the feedback cancellation module 101; and in a third form, the ADC may also be independent of the feedback cancellation module 101, and located between the feedback cancellation module 101 and the first DPD 102. For the ADCs of the first and the second forms, analog-to-digital conversion may be performed on the signal output by the PA 103, so that the feedback cancellation module 101 performs interference cancellation for a digital signal. The ADCs of the first and the second form only differ in specific locations of the ADCs.

For the ADC of the third form, analog-to-digital conversion may be performed on a signal on which the feedback cancellation module 101 has performed feedback interference cancellation. That is, the feedback cancellation module 101 may also perform processing for an analog signal, and convert the analog signal to a digital signal after the processing.

It should be noted that for processing and a transmission process of an analog signal, a secondary interference signal is easily generated. Therefore, in this embodiment of the present invention, the feedback cancellation module 101 may perform processing for a digital signal, that is, on the feedback channel, the feedback cancellation module 101 and the PA 103 may be specifically connected through the ADC.

The signal of the feedback channel may include: a feedback signal corresponding to the first transmit channel, and an interference signal that is generated when the feedback channel is interfered with by the first transmit channel; and may further include an interference signal that is generated when the feedback channel is interfered with by one or more other transmit channels except the first transmit channel in the transmitter. That is, in this case, the signal of the feedback channel is a mixed signal that includes various signals. It should be noted that the feedback signal corresponding to the first transmit channel refers to a signal output by a power amplifier on the first transmit channel and then fed back to the feedback channel, for example, a signal coupled to the feedback channel.

The feedback cancellation signal may be a signal obtained according to a feedback interference signal that is collected when the feedback channel is in an idle state. For example, assuming that the feedback channel corresponds only to the first transmit channel, when the feedback channel is in an idle state, a feedback signal corresponding to the first transmit channel does not exist on the feedback channel, and the signal on the feedback channel is an interference signal except the feedback signal corresponding to the first transmit channel; therefore the feedback interference signal may be obtained according to an interference signal that is collected when the feedback channel is in the idle state.

That the feedback channel is in the idle state may be implemented by disconnecting the feedback channel from the transmit channel or grounding the feedback channel, which is not limited herein.

Specifically, the feedback cancellation signal may directly be the feedback interference signal, or may be an inverse signal of the feedback interference signal. In addition, the feedback interference signal may be an analog signal, or the feedback cancellation signal may be a digital signal generated according to the feedback interference signal. If the feedback cancellation signal is the feedback interference signal, the feedback cancellation module 101 performs interference cancellation on the signal of the feedback channel according to the feedback cancellation signal. Specifically, when the feedback channel is connected to the PA 103 of the first transmit channel, signal decomposition is performed on the signal of the feedback channel, and the feedback cancellation signal is subtracted, so as to obtain the first mixed signal. If the feedback cancellation signal is the inverse signal of the feedback interference signal, the feedback cancellation module 101 performs interference cancellation on the signal of the feedback channel according to the feedback cancellation signal. Specifically, the feedback cancellation signal is added to the signal of the feedback channel to obtain the first mixed signal. The first mixed signal does not include at least: the interference signal that is generated when the feedback channel is interfered with by the first transmit channel. It should be noted that the feedback cancellation module 101 may be an integrated circuit or a chip that can implement the foregoing functions, or may be a processor that integrates the foregoing functions.

In the transmitter provided in this embodiment of the present invention, before a first DPD performs linear predistortion processing, a feedback cancellation module is used to perform interference cancellation on a signal of a feedback channel, and interference of the first transmit channel to the feedback channel is successfully canceled, thereby avoiding an interference signal on the feedback channel from interfering with the first transmit channel, and greatly reducing distortion of a transmit signal on the first transmit channel.

It should be noted that, this embodiment of the present invention is applicable in systems such as a mobile communications network, a fixed wireless access network, wireless data transmission and radar.

Although an interference cancellation solution for the first transmit channel is described only in this embodiment of the present invention, an interference cancellation solution for another transmit channel in the transmitter is similar to the foregoing structure. If the transmitter includes at least two transmit channels and one feedback channel, the feedback channel may include one feedback cancellation module, or may include at least two feedback cancellation modules.

Examples are given below for description:

In a case in which a feedback channel of a transmitter includes one feedback cancellation module, one feedback cancellation module similar to the foregoing feedback cancellation module may be used, and the one feedback cancellation module is also connected to a DPD and a PA on another transmit channel. The one feedback cancellation module separately performs interference cancellation on a signal of the feedback channel according to a feedback cancellation signal that corresponds to a respective transmit channel, so as to cancel interference of each transmit channel to the feedback channel.

In a case in which a feedback channel of a transmitter includes at least two feedback cancellation modules, the at least two feedback cancellation modules separately correspond to one transmit channel, and any one of the feedback cancellation modules is connected to a DPD and a PA of a corresponding transmit channel. The at least two feedback cancellation modules are the same as the foregoing feedback cancellation module.

Embodiment 2

Figure 2:
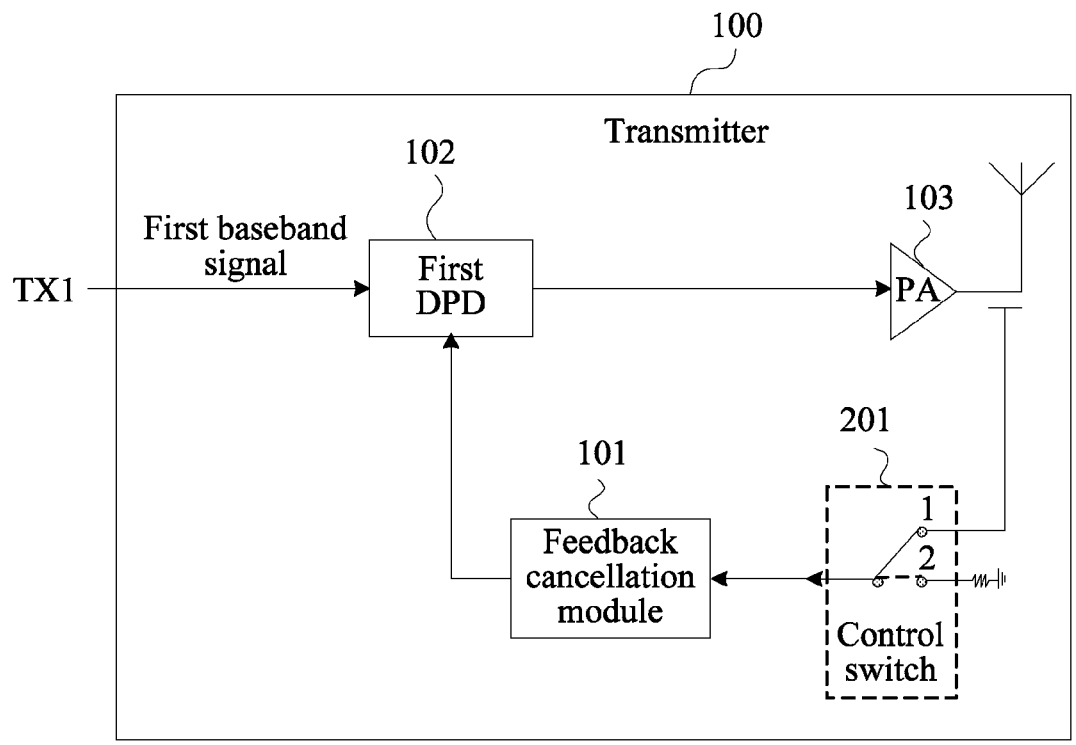
FIG. 2 is a schematic structural diagram of another transmitter according to Embodiment 2 of the present invention.

FIG. 2 is a schematic structural diagram of another transmitter according to Embodiment 2 of the present invention. On the basis of the embodiment shown in FIG. 1, the transmitter 100 further includes a control switch 201. The feedback cancellation module 101 may be connected to the PA 103 through the control switch 201, and a status of the control switch 201 may include being connected to the PA 103.

The feedback cancellation module 101 is specifically configured to: when the control switch 201 is connected to the PA 103, acquire the signal of the feedback channel, perform, according to the feedback cancellation signal, interference cancellation on the signal of the feedback channel, to obtain the first mixed signal, and send the first mixed signal to the first DPD 102.

Preferably, the status of the control switch 201 further includes grounded or floating, and when the status of the control switch 201 is grounded or floating, the feedback channel is in an idle state.

The feedback cancellation module 101 is further configured to: when the status of the control switch 201 is grounded or floating, acquire the feedback cancellation signal by collecting the feedback interference signal of the feedback channel.

Specifically, as shown in FIG. 2, the control switch 201 may be a single-pole multi-state switch. Connection between the feedback cancellation module 101 and the PA 103 is implemented by switching a single pole of the control switch 201 to a state 1, so that the feedback cancellation module 101 acquires the signal of the feedback channel; and grounded or floating may be implemented by switching the single pole of the control switch 201 to a state 2, so that the feedback cancellation module 101 acquires the feedback cancellation signal by collecting the feedback interference signal of the feedback channel.

For example, assuming that the feedback channel corresponds only to the first transmit channel, the status of the control switch 201 is grounded or floating, the signal of the feedback channel is an interference signal except a feedback signal that corresponds to the first transmit channel, that is, an interference signal that is generated when the feedback channel is interfered with by the first transmit channel, that is, the feedback interference signal. Therefore, the feedback interference signal may be an interference signal that is collected by the feedback cancellation module 101 when the status of the control switch 201 is grounded or floating.

Optionally, the first DPD 102 is further configured to: before generating the first predistortion signal, perform linear predistortion processing on a baseband signal preceding the first baseband signal on the first transmit channel, to generate a second predistortion signal, and send the second predistortion signal to the feedback cancellation module 101.

The feedback cancellation module 101 is further configured to: when the status of the control switch 201 is grounded or floating, collect the feedback interference signal of the feedback channel, acquire a first parameter according to a correlation between the second predistortion signal sent by the first DPD 102 and the feedback interference signal, and acquire the feedback cancellation signal according to the first parameter and the second predistortion signal.

It should be noted that, referring to the embodiment shown in FIG. 1, when the feedback channel is in the idle state, the signal of the feedback channel does not include a feedback signal that corresponds to any transmit channel.

Assuming that the transmitter includes two or more transmit channels, and the feedback channel corresponds to the two or more transmit channels, if the feedback channel is in the idle state, the signal of the feedback channel further includes an interference signal that is generated when the feedback channel is interfered with by another transmit signal in addition to the interference signal that is generated when the feedback channel is interfered with by the first transmit channel. Because the interference signal that is generated when the feedback channel is interfered with by the first transmit channel and a signal transmitted by the first transmit channel both include a signal of a same data packet or a similar data packet, the signals are highly similar to each other and are highly correlated. Therefore, when the signal transmitter by the first transmit channel is a predistortion signal generated by the first DPD 102, the feedback cancellation module 101 may decompose, according to a correlation between the second predistortion signal that is generated by the first DPD 102 before generating the first predistortion signal and the signal of the feedback channel, the signal of the feedback channel into the interference signal that is generated when the feedback channel is interfered with by the first transmit channel, and the interference signal that is generated when the feedback channel is interfered with by one or more other transmit channels; and then acquire a relative coefficient between the interference signal that is generated when the feedback channel is interfered with by the first transmit channel and the second predistortion signal, that is, the first parameter.

In this case, the feedback cancellation module 101 may obtain the feedback cancellation signal by multiplying the first parameter and the second predistortion signal.

It should be noted that operations on the feedback cancellation signal and interference cancellation on the feedback channel may both be iteratively performed according to a preset period. In this case, the baseband signal preceding the first baseband signal on the first transmit channel may be a baseband signal on the first transmit channel in a previous period of a current period, and then the second predistortion signal is a predistortion signal that is generated by the first DPD 102 in a previous period. That is, the foregoing second predistortion signal may be a predistortion signal that is generated by the first DPD 102 in a previous period.

In the transmitter provided in this embodiment of the present invention, a feedback interference signal that is obtained when a control switch is changed to floating or grounded is more accurate, so that a determined feedback cancellation signal is more accurate, thereby better ensuring that interference cancellation performed by a feedback cancellation module is more thorough and accurate, improving linearity of a signal, and reducing nonlinear distortion.

Embodiment 3

Figure 3:
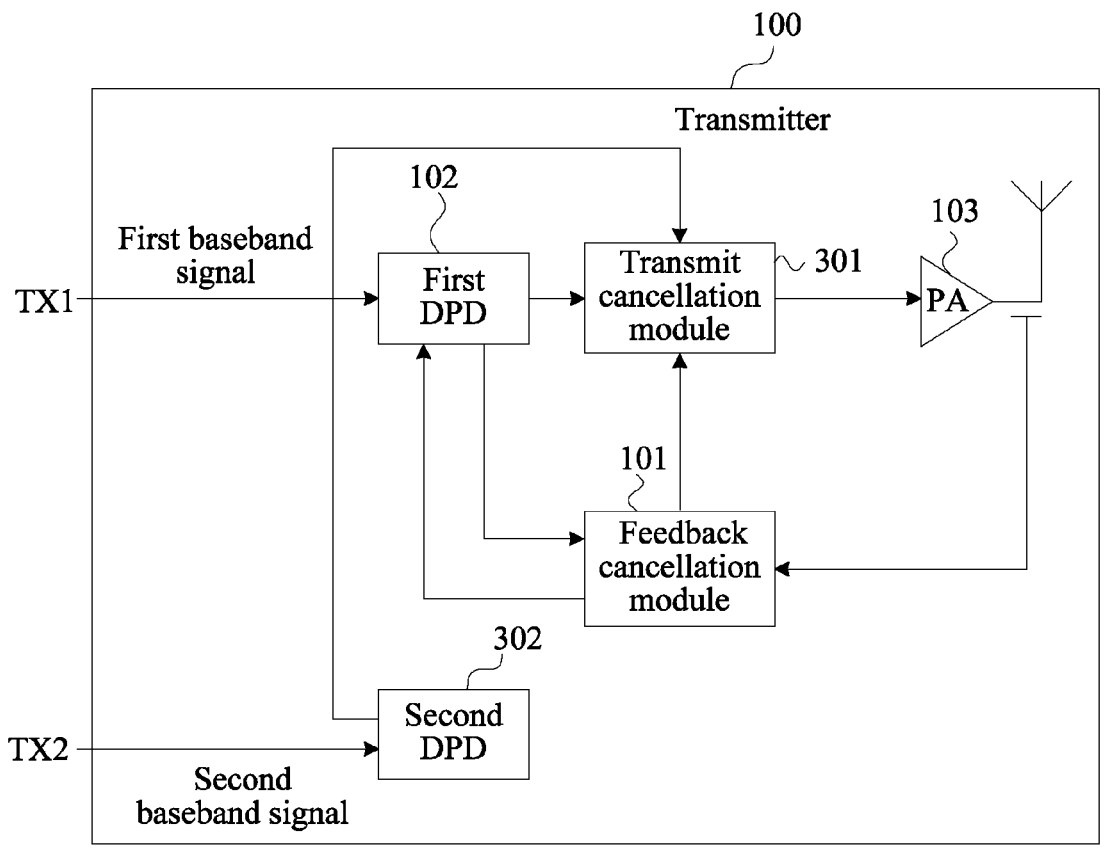
FIG. 3 is a schematic structural diagram of another transmitter according to Embodiment 3 of the present invention.

On the basis of the embodiment shown in FIG. 1 and FIG. 2, Embodiment 3 of the present invention provides another transmitter. FIG. 3 is a schematic structural diagram of another transmitter according to Embodiment 3 of the present invention. The embodiment shown in FIG. 3 uses a transmitter that is obtained by combining a transmit cancellation module and the embodiment shown in FIG. 1 as an example for description. As shown in FIG. 3, the transmitter 100 further includes: a transmit cancellation module 301. The transmit cancellation module 301 is located on the first transmit channel, and the first DPD 102 is connected to the PA 103 through the transmit cancellation module 301.

The transmit cancellation module 301 is configured to perform, according to a first transmit cancellation signal, interference cancellation on the first predistortion signal generated by the first DPD 102, to obtain a to-be-transmitted signal, and send the to-be-transmitted signal to the PA 103.

The first transmit cancellation signal is a signal obtained according to an interference signal that is generated when the first transmit channel is interfered with by one or more other transmit channels except the first transmit channel in the transmitter.

Specifically, the first transmit cancellation signal may directly be a transmit interference signal, or may be an inverse signal of the transmit interference signal. The transmit interference signal may include an interference signal that is generated when the first transmit channel is interfered with by one or more other transmit channels except the first transmit channel in the transmitter.

Further, the performing, by the transmit cancellation module 301, interference cancellation on the first predistortion signal according to the first transmit cancellation signal to obtain a to-be-transmitted signal may include:

if the first transmit cancellation signal is the transmit interference signal, performing signal decomposition on the first predistortion signal, and subtracting the first transmit cancellation signal, to obtain the to-be-transmitted signal; or if the first transmit cancellation signal is the inverse signal of the transmit interference signal, adding the first transmit cancellation signal to the first predistortion signal, to obtain the to-be-transmitted signal.

It should be noted that the transmit interference signal may be an analog signal, and is not limited herein.

In this embodiment of the present invention, a transmit cancellation module performs interference cancellation on a predistortion signal on a first transmit channel according to a first transmit cancellation signal, and interference of one or more other transmit channels except the first transmit channel in the transmitter to the first transmit channel can be successfully canceled, so that interference to the first transmit channel is reduced, thereby reducing distortion of a transmit signal on the first transmit channel.

Further, in the transmitter 100, the transmit cancellation module 301 is connected to the feedback cancellation module 101, the transmitter 100 further includes a second DPD 302, and the second DPD 302 is located on a second transmit channel of the transmitter 100 and is connected to the transmit cancellation module 301. The second transmit channel is any transmit channel except the first transmit channel in the transmitter 100.

The feedback cancellation module 101 is further configured to send the first mixed signal to the transmit cancellation module 301.

The second DPD 302 is configured to generate a predistortion signal according to a second baseband signal, and send the predistortion signal to the transmit cancellation module 301, where the second baseband signal is a baseband signal of the second transmit channel.

The transmit cancellation module 301 is specifically configured to: before performing interference cancellation on the first predistortion signal according to the first transmit cancellation signal, acquire a second parameter according to a correlation between the first mixed signal sent by the feedback cancellation module 101 and the predistortion signal generated by the second DPD 302, and acquire the first transmit cancellation signal according to the second parameter and the predistortion signal generated by the second DPD 302.

Specifically, when the PA 103 is connected to the feedback cancellation module 101, an interference signal that is generated when the first transmit channel is interfered with by another transmit signal except the first transmit channel in the transmitter, that is, the transmit interference signal is transmitted to the feedback channel of the transmitter through the PA 103 of the first transmit channel, so that the signal of the feedback channel further includes the transmit interference signal. That is, the first mixed signal that is generated after the feedback cancellation module 101 performs interference cancellation on the signal of the feedback channel further includes the transmit interference signal. Because the transmit interference signal is the interference signal that is generated when the first transmit channel is interfered with by another transmit signal except the first transmit channel in the transmitter, a predistortion signal of another transmit channel in the transmitter, that is, the predistortion signal generated by the second DPD 302 includes a data packet same as or similar to that of the transmit interference signal. Because signals of a same or similar data packet have a small difference, that is, the signals are highly correlated, the transmit interference signal may be acquired from the first mixed signal according to the correlation between the first mixed signal and the predistortion signal generated by the second DPD 302, and then a relative coefficient between the transmit interference signal and the predistortion signal generated by the second DPD 302, that is, the second parameter, is determined.

In this case, the transmit cancellation module 301 may multiply the second parameter and the predistortion signal generated by the second DPD 203, to obtain the first transmit cancellation signal.

In this embodiment of the present invention, by using the foregoing method, a first transmit cancellation signal can be determined more accurately, thereby better ensuring that interference cancellation performed by a transmit cancellation module is more thorough and accurate, improving linearity of a signal, and reducing nonlinear distortion.

It should be noted that, in the solution of this embodiment, a control switch similar to that in Embodiment 2 may also be disposed between the feedback cancellation module 101 and the PA 103. The idle state of the feedback channel is implemented by grounding or floating the control switch, and connection between the feedback cancellation module 101 and the PA 103 is implemented by connection between the control switch and the PA 103, which are not described in detail herein again.

Embodiment 4

Figure 4:
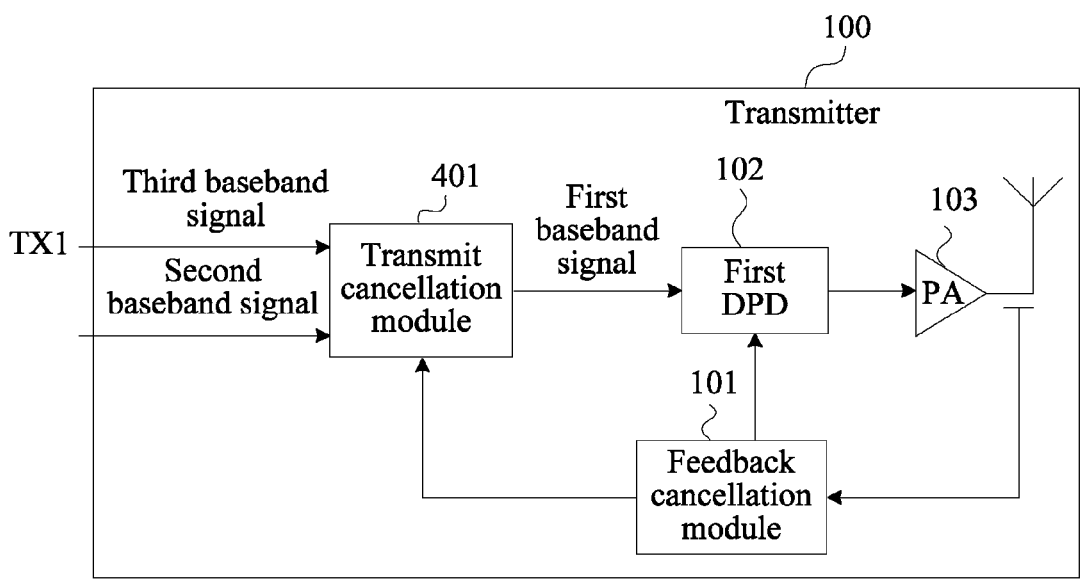
FIG. 4 is a schematic structural diagram of another transmitter according to Embodiment 4 of the present invention.

On the basis of the embodiment shown in FIG. 1 and FIG. 2, Embodiment 4 of the present invention provides another transmitter. FIG. 4 is a schematic structural diagram of another transmitter according to Embodiment 4 of the present invention. The embodiment shown in FIG. 4 uses a transmitter that is obtained by combining a transmit cancellation module and the embodiment shown in FIG. 1 as an example for description. As shown in FIG. 4, the transmitter 100 further includes: a transmit cancellation module 401. The transmit cancellation module 401 is located on the first transmit channel, and is connected to the PA 103 through the first DPD 102.

The transmit cancellation module 401 is configured to perform, according to a second transmit cancellation signal, interference cancellation on a third baseband signal on the first transmit channel, to obtain the first baseband signal, and send the first baseband signal to the first DPD 102.

The second transmit cancellation signal may be a signal obtained according to an interference signal that is generated when the first transmit channel is interfered with by one or more other transmit channels except the first transmit channel in the transmitter.

The transmit cancellation module in this embodiment of the present invention has a different location on the first transmit channel inside the transmitter from that in the foregoing solution of Embodiment 3, and the transmit cancellation module performs interference cancellation on different signals according to the second transmit cancellation signal. In the foregoing solution of Embodiment 3, the transmit cancellation module performs interference pre-cancellation on a predistortion signal generated by the first DPD, that is, the first predistortion signal; while in this embodiment of the present invention, the transmit cancellation module may perform interference pre-cancellation on a baseband signal according to the second transmit cancellation signal before the first DPD generates the predistortion signal.

Further, in the solution as described above, the transmit cancellation module 401 is further connected to the feedback cancellation module 101.

The feedback cancellation module 101 is further configured to send the first mixed signal to the transmit cancellation module 401.

The transmit cancellation module 401 is further configured to: before performing interference cancellation on the third baseband signal, acquire a third parameter according to a correlation between the first mixed signal sent by the feedback cancellation module 101 and a second baseband signal, and acquire the second transmit cancellation signal according to the third parameter and the second baseband signal; where the second baseband signal is a baseband signal of a second transmit channel in the transmitter; and the second transmit channel is any transmit channel except the first transmit channel in the transmitter.

Specifically, when the PA 103 is connected to the feedback cancellation module 101, an interference signal that is generated when the first transmit channel is interfered with by another transmit signal except the first transmit channel in the transmitter, that is, the transmit interference signal is transmitted to the feedback channel of the transmitter through the PA 103 of the first transmit channel, so that the signal of the feedback channel further includes the transmit interference signal. That is, the first mixed signal that is generated after the feedback cancellation module 101 performs interference cancellation on the signal of the feedback channel further includes the transmit interference signal.

Because the transmit interference signal is the interference signal that is generated when the first transmit channel is interfered with by another transmit signal except the first transmit channel in the transmitter, a baseband signal of another transmit channel in the transmitter, that is, the second baseband signal includes a data packet same as or similar to that of the first mixed signal. Because signals of a same or similar data packet have a small difference, that is, the signals are highly correlated, the transmit interference signal may be acquired from the first mixed signal according to the correlation between the first mixed signal and the second baseband signal, and then a relative coefficient between the transmit interference signal and the second baseband signal, that is, the third parameter, is determined.

In this case, the transmit cancellation module 401 may multiply the third parameter and the second baseband signal, to obtain the second transmit cancellation signal.

In the transmitter provided in this embodiment of the present invention, before a first DPD performs linear predistortion, a transmit cancellation module cancels interference of another transmit signal except the first transmit channel in the transmitter to the first transmit channel according to a second transmit cancellation signal, thereby reducing distortion of a transmit signal on the first transmit channel and ensuring linearity of the transmit signal. In addition, a specific solution for determining a second transmit cancellation signal is used to make the second transmit cancellation signal more accurate, thereby better ensuring that interference cancellation performed by the transmit cancellation module is more thorough and accurate, improving linearity of a signal, and reducing nonlinear distortion.

It should be noted that, in the solution of this embodiment, a control switch similar to that in Embodiment 2 may also be disposed between the feedback cancellation module 101 and the PA 103. The idle state of the feedback channel is implemented by grounding or floating the control switch, and connection between the feedback cancellation module 101 and the PA 103 is implemented by connection between the control switch and the PA 103, which are not described in detail herein again.

Embodiment 5

Figure 5:
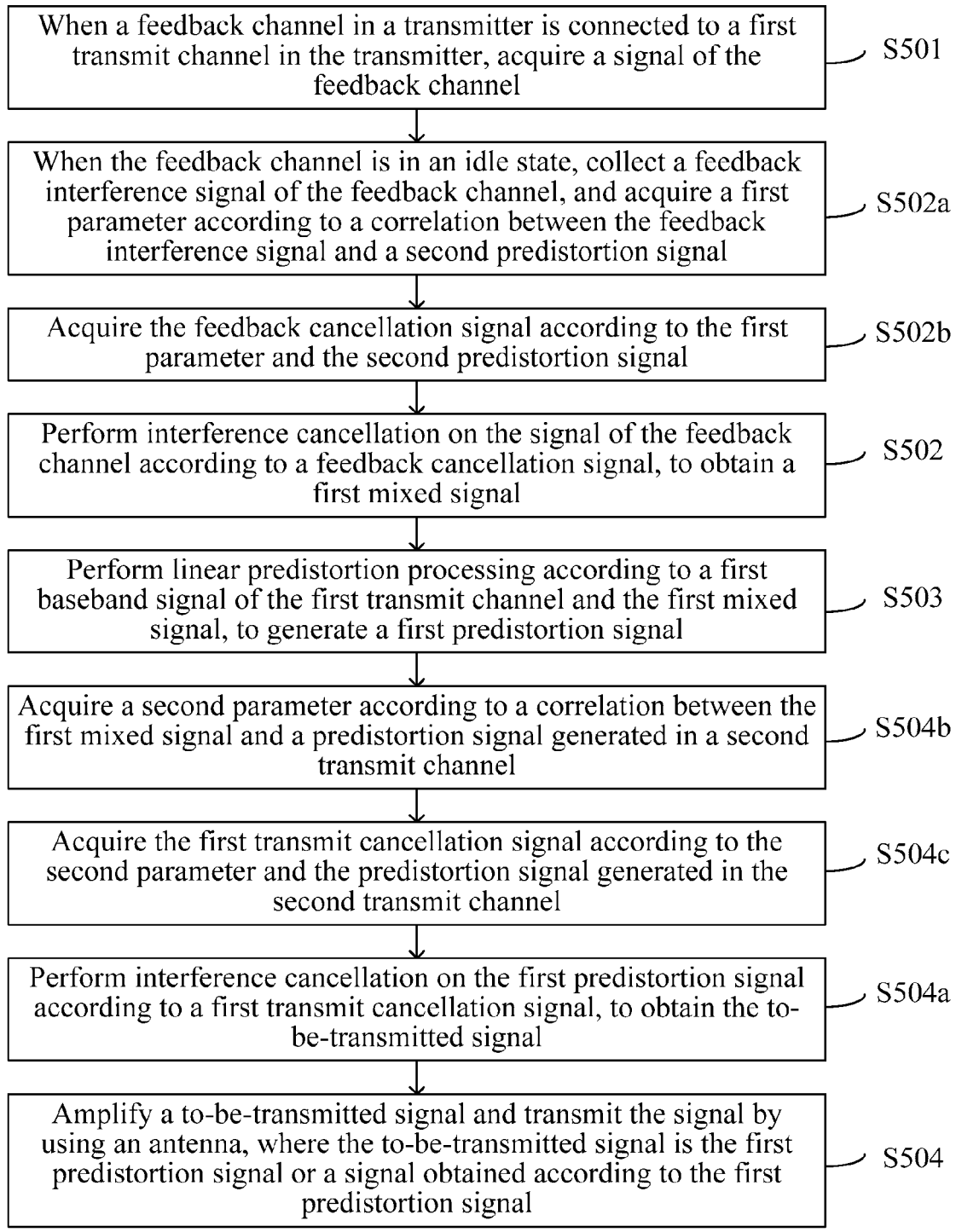
FIG. 5 is a flowchart of an interference cancellation method according to Embodiment 5 of the present invention.

Embodiment 4 of the present invention further provides an interference cancellation method. The method may be executed by the transmitter described in any of the foregoing embodiments. FIG. 5 is a flowchart of an interference cancellation method according to Embodiment 5 of the present invention. The method is specifically described below.

Step 501: When a feedback channel in a transmitter is connected to a first transmit channel in the transmitter, acquire a signal of the feedback channel.

Step 502: Perform interference cancellation on the signal of the feedback channel according to a feedback cancellation signal, to obtain a first mixed signal.

The feedback cancellation signal is a signal obtained according to a feedback interference signal that is collected when the feedback channel is in an idle state.

For the idle state, reference may be made to related descriptions in the embodiment shown in FIG. 1.

Step 503: Perform linear predistortion processing according to a first baseband signal of the first transmit channel and the first mixed signal, to generate a first predistortion signal.

Step 504: Amplify a to-be-transmitted signal and then transmit the signal by using an antenna, where the to-betransmitted signal is the first predistortion signal or a signal obtained according to the first predistortion signal.

This embodiment of the present invention may be executed by the transmitter described in the foregoing embodiments, and specific implementation processes and beneficial effects of this embodiment of the present invention are similar to those of the foregoing embodiments, and the details are not provided herein again.

Further, in step 502 in this embodiment, before the performing interference cancellation on the signal of the feedback channel according to a feedback cancellation signal, the method further includes:

Step 502a: When the feedback channel is in the idle state, collect the feedback interference signal of the feedback channel, and acquire a first parameter according to a correlation between the feedback interference signal and a second predistortion signal.

Step 502b: Acquire the feedback cancellation signal according to the first parameter and the second predistortion signal.

The second predistortion signal is a predistortion signal that is generated by performing linear predistortion on a baseband signal preceding the first baseband signal transmitted on the first transmit channel.

Optionally, in step 502, before the performing interference cancellation on the signal of the feedback channel according to a feedback cancellation signal, the method further includes: when the feedback channel is in the idle state, acquiring the feedback cancellation signal by collecting the feedback interference signal of the feedback channel.

In the solution described above, the idle state includes: floating or grounded.

Further, in step 504 of the foregoing solution, before the amplifying a to-be-transmitted signal and then transmitting the signal by using an antenna, the method further includes:

Step 504a: Perform interference cancellation on the first predistortion signal according to a first transmit cancellation signal, to obtain the to-be-transmitted signal.

The first transmit cancellation signal is a signal obtained according to an interference signal that is generated when the first transmit channel is interfered with by a transmit channel except the first transmit channel in the transmitter.

Further, in step 504a in the solution described above, before the performing interference cancellation on the first predistortion signal according to a first transmit cancellation signal, the method further includes:

Step 504b: Acquire a second parameter according to a correlation between the first mixed signal and a predistortion signal generated in a second transmit channel.

Step 504c: Acquire the first transmit cancellation signal according to the second parameter and the predistortion signal generated in the second transmit channel.

The second transmit channel is any transmit channel except the first transmit channel in the transmitter.

It should be noted that, for a specific implementation manner of obtaining the first transmit cancellation signal, reference may be made to related descriptions in the embodiment shown in FIG. 2, and the details are not provided again.

Figure 6:
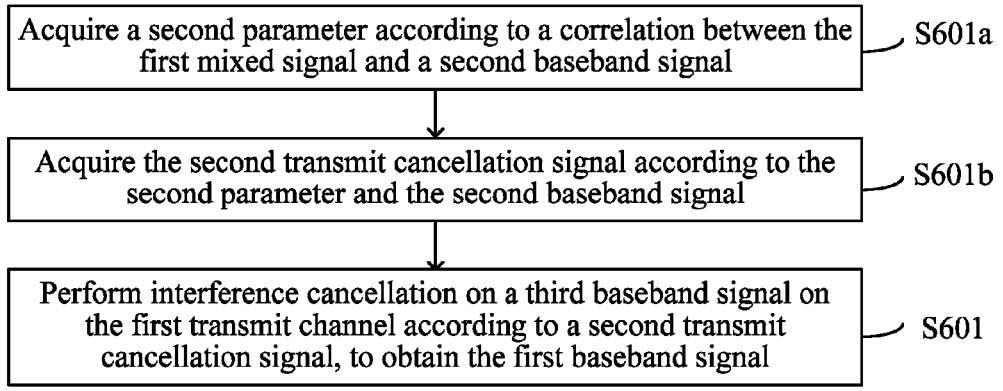
FIG. 6 is a flowchart of another interference cancellation method according to Embodiment 5 of the present invention.

Alternatively, this embodiment further provides an interference cancellation method. FIG. 6 is a flowchart of another interference cancellation method according to Embodiment 5 of the present invention. As shown in FIG. 6, in step 503 in the solution described above, before the performing linear predistortion processing according to a first baseband signal of the first transmit channel and the first mixed signal, the method further includes:

Step 601: Perform interference cancellation on a third baseband signal on the first transmit channel according to a second transmit cancellation signal, to obtain the first baseband signal.

The transmit cancellation signal is a signal obtained according to an interference signal that is generated when the first transmit channel is interfered with by one or more other transmit channels except the first transmit channel in the transmitter.

Further, in step 601, before the performing interference cancellation on a third baseband signal on the first transmit channel according to a second transmit cancellation signal, the method further includes:

Step 601a: Acquire a second parameter according to a correlation between the first mixed signal and a second baseband signal.

Step 601b: Acquire the second transmit cancellation signal according to the second parameter and the second baseband signal.

The second transmit channel is any transmit channel except the first transmit channel in the transmitter, and the second baseband signal is a baseband signal of the second transmit channel.

It should be noted that, for a specific implementation manner of obtaining the second transmit cancellation signal, reference may be made to related descriptions in the embodiment shown in FIG. 3, and the details are not provided again.

This embodiment of the present invention may be executed by the transmitter described in the foregoing embodiments, and specific implementation processes and beneficial effects of this embodiment of the present invention are similar to those of the foregoing embodiments, and the details are not provided herein again.

Embodiment 6

Figure 7:
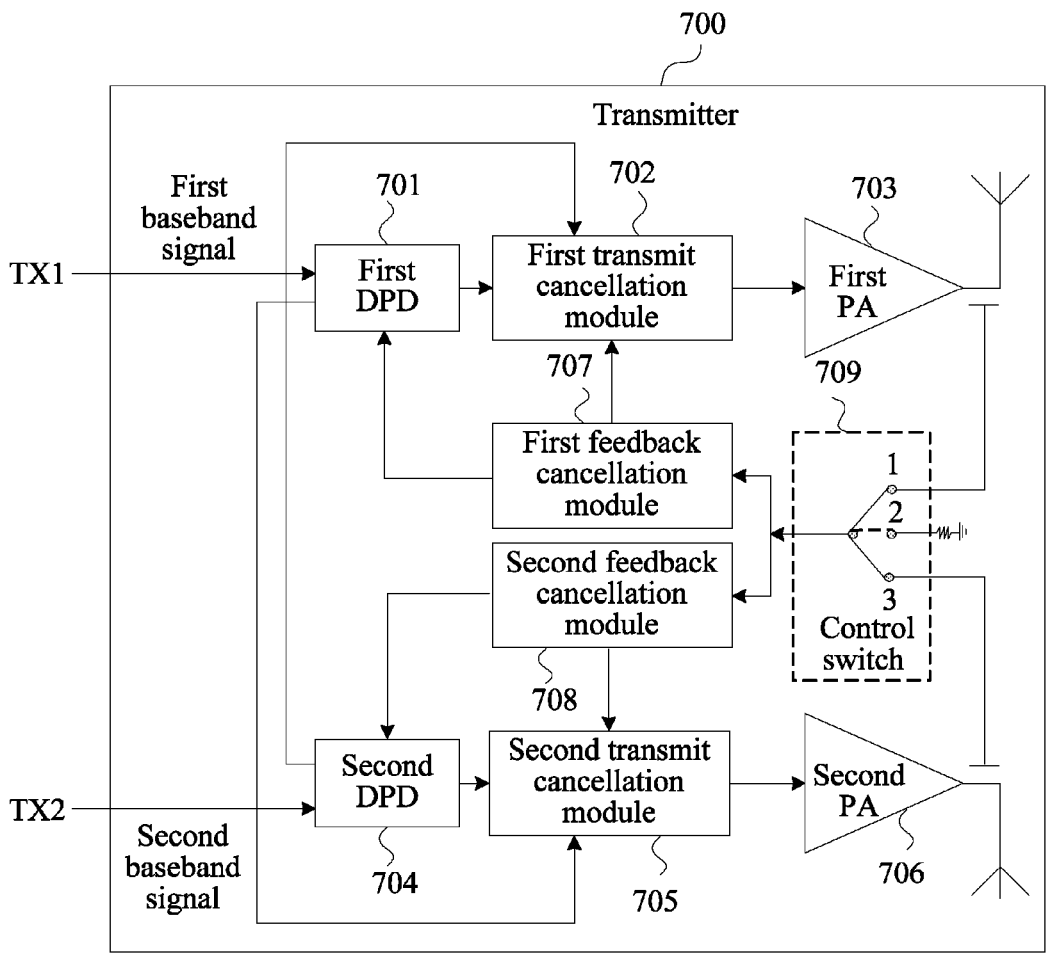
FIG. 7 is a schematic structural diagram of another transmitter according to Embodiment 6 of the present invention.

This embodiment of the present invention further provides a transmitter and an interference cancellation method. Specifically, description is made by using an example in which the transmitter includes two transmit channels and one feedback channel. FIG. 7 is a schematic structural diagram of another transmitter according to Embodiment 6 of the present invention.

A transmitter 700 shown in FIG. 7 includes a first transmit channel TX1, a second transmit channel TX2 and a feedback channel. A baseband signal of the first transmit channel TX1 is a first baseband signal, and a baseband signal of the second transmit channel TX2 is a second baseband signal. The transmitter 700 includes: a first DPD 701, a first transmit cancellation module 702 and a first PA 703. The first DPD 701, the first transmit cancellation module 702 and the first PA 703 are located on the first transmit channel TX1, and are connected in sequence. The transmitter 700 further includes: a second DPD 704, a second transmit cancellation module 705 and a second PA 706. The second DPD 704, the second transmit cancellation module 705 and the second PA 706 are located on the second transmit channel TX2, and are connected in sequence. The feedback channel of the transmitter 700 includes: a first feedback cancellation module 707 and a second feedback cancellation module 708. The transmitter 700 further includes a control switch 709. The first feedback cancellation module 707 is connected to the first transmit cancellation module 702 and the first DPD 701, and the second feedback cancellation module 708 is connected to the second transmit cancellation module 705 and the second DPD 704. The first transmit cancellation module 702 is also connected to the second DPD 704. The second transmit cancellation module 705 is also connected to the first DPD 701.

The control switch 709 is a single-pole 3-state switch, that is, the switch includes 3 states. If a state of the control switch 709 is a state 1, the first feedback cancellation module 707 is connected to the first PA 703 through the control switch 709; if the state of the control switch 709 is a state 2, the first feedback cancellation module 707 and the second feedback cancellation module 708 may be both grounded or floating by using the control switch 709, and in this case, the feedback channel is in an idle state; and if the state of the control switch 709 is a state 3, the second feedback cancellation module 708 may be connected to the second PA 706 through the control switch 709.

Figure 8:
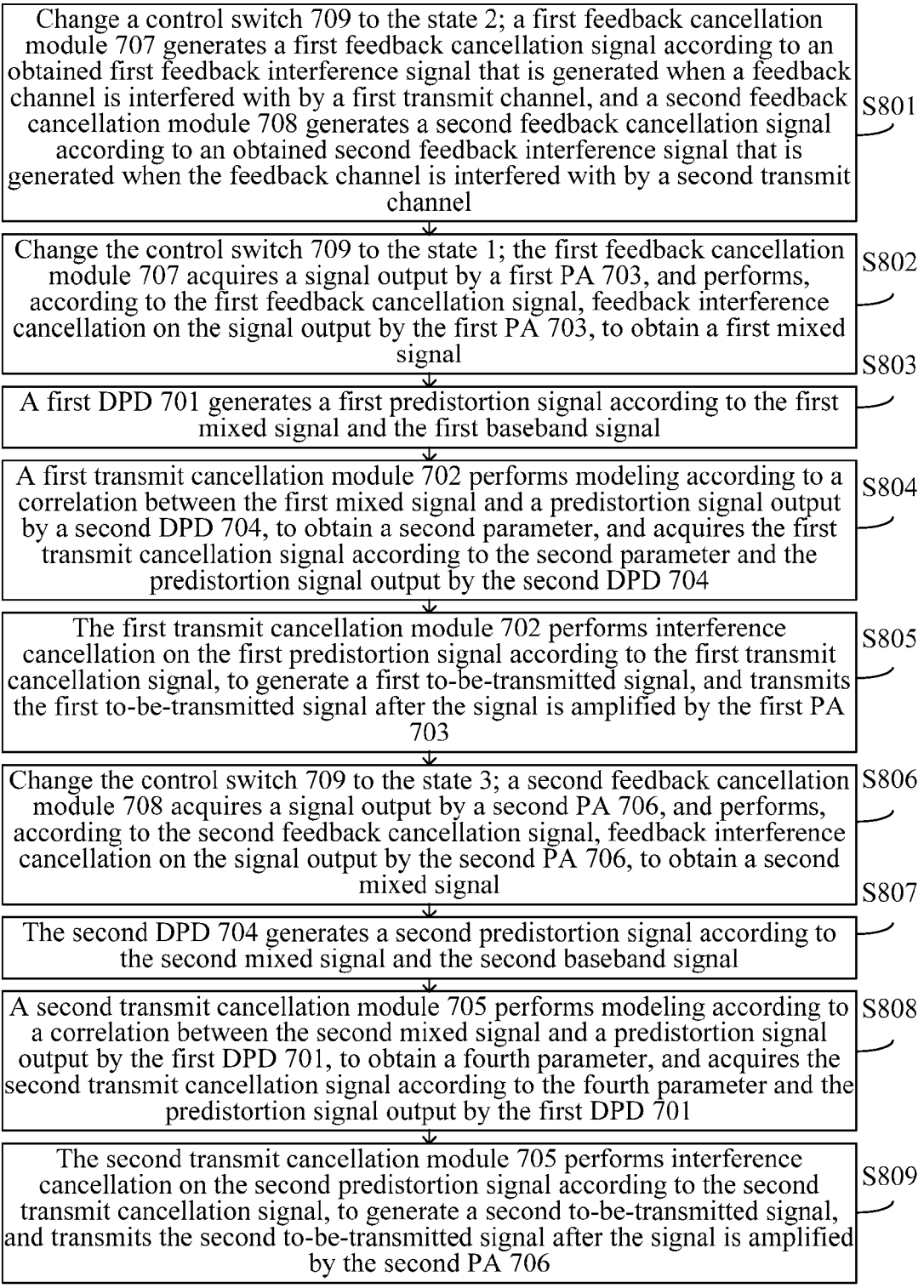
FIG. 8 is a flowchart of another interference cancellation method according to Embodiment 6 of the present invention.

FIG. 8 is a flowchart of another interference cancellation method according to Embodiment 6 of the present invention. The method is executed by the transmitter shown in FIG. 7. Specifically, state switchover of a feedback channel may be implemented by changing a state of a control switch. The method may include the following steps:

Step 801: Change the control switch 709 to the state 2, the first feedback cancellation module 707 generates a first feedback cancellation signal according to an obtained first feedback interference signal that is generated when the feedback channel is interfered with by the first transmit channel, and the second feedback cancellation module 708 generates a second feedback cancellation signal according to an obtained second feedback interference signal that is generated when the feedback channel is interfered with by the second transmit channel.

Specifically, the first feedback cancellation signal may be a signal obtained as follows: the first feedback cancellation module 707 first acquires a first parameter according to a correlation between a predistortion signal that is generated by the first DPD 701 on the first transmit channel according to a baseband signal preceding the first baseband signal on the first transmit channel, and the first feedback interference signal of the feedback channel when the control switch 709 is in the state 2, and then acquires the first feedback cancellation signal according to the first parameter and the predistortion signal that is generated by the first DPD 701 according to a baseband signal preceding the first baseband signal on the first transmit channel. Similarly, the second feedback cancellation signal may be a signal obtained as follows: the second feedback cancellation module 708 acquires a third parameter according to a correlation between a predistortion signal that is generated by the second DPD 704 on the second transmit channel according to a baseband signal preceding the second baseband signal on the second transmit channel, and the second feedback interference signal of the feedback channel when the control switch 709 is in the state 2, and then acquires the second feedback cancellation signal according to the third parameter and the predistortion signal that is generated by the second DPD 704 according to a baseband signal preceding the second baseband signal on the second transmit channel.

The first feedback cancellation signal may also be a signal obtained as follows: the first feedback cancellation module 707 first acquires a first parameter according to a correlation between a baseband signal of the first transmit channel, that is, the first baseband signal, and the first feedback interference signal of the feedback channel when the control switch 709 is in the state 2, and then acquires the first feedback cancellation signal according to the first parameter and the first baseband signal. Similarly, the second feedback cancellation signal may also be a signal obtained as follows: the second feedback cancellation module 708 acquires a third parameter according to a correlation between a baseband signal of the second transmit channel, that is, the second baseband signal, and the second feedback interference signal of the feedback channel when the control switch 709 is in the state 2, and then acquires the second feedback cancellation signal according to the third parameter and the second baseband signal.

Step 802: Change the control switch 709 to the state 1; the first feedback cancellation module 707 acquires a signal output by the first PA 703, and performs, according to the first feedback cancellation signal, feedback interference cancellation on the signal output by the first PA 703, to obtain a first mixed signal.

Step 803: The first DPD 701 generates a first predistortion signal according to the first mixed signal and the first baseband signal.

Step 804: The first transmit cancellation module 702 performs modeling according to a correlation between the first mixed signal and a predistortion signal output by the second DPD 704, to obtain a second parameter, and acquires the first transmit cancellation signal according to the second parameter and the predistortion signal output by the second DPD 704.

The predistortion signal output by the second DPD 704 may be a predistortion signal that is generated by the second DPD 704 according to the second baseband signal.

Step 805: The first transmit cancellation module 702 performs interference cancellation on the first predistortion signal according to the first transmit cancellation signal, to generate a first to-be-transmitted signal, and transmits the first to-be-transmitted signal after the signal is amplified by the first PA 703.

Step 806: Change the control switch 709 to the state 3; the second feedback cancellation module 708 acquires a signal output by the second PA 706, and performs, according to the second feedback cancellation signal, feedback interference cancellation on the signal output by the second PA 706, to obtain a second mixed signal.

Step 807: The second DPD 704 generates a second predistortion signal according to the second mixed signal and the second baseband signal.

Step 808: The second transmit cancellation module 705 performs modeling according to a correlation between the second mixed signal and a predistortion signal output by the first DPD 701, to obtain a fourth parameter, and acquires the second transmit cancellation signal according to the fourth parameter and the predistortion signal output by the first DPD 701.

Step 809: The second transmit cancellation module 705 performs interference cancellation on the second predistortion signal according to the second transmit cancellation signal, to generate a second to-be-transmitted signal, and transmits the second to-be-transmitted signal after the signal is amplified by the second PA 706.

Description is made by using specific examples in this embodiment of the present invention. Beneficial effects thereof are similar to those of the foregoing embodiments, and the details are not provided herein again.

It should be noted that, although this embodiment of the present invention is described by using an example in which a transmitter has two transmit channels and one feedback channel, this embodiment of the present invention is also applicable to a case in which a transmitter includes more than two transmit channels and one feedback channel. The case in which a transmitter includes more than two transmit channels and one feedback channel can be implemented by only adaptively modifying this embodiment of the present invention.

Embodiment 7

Figure 9:
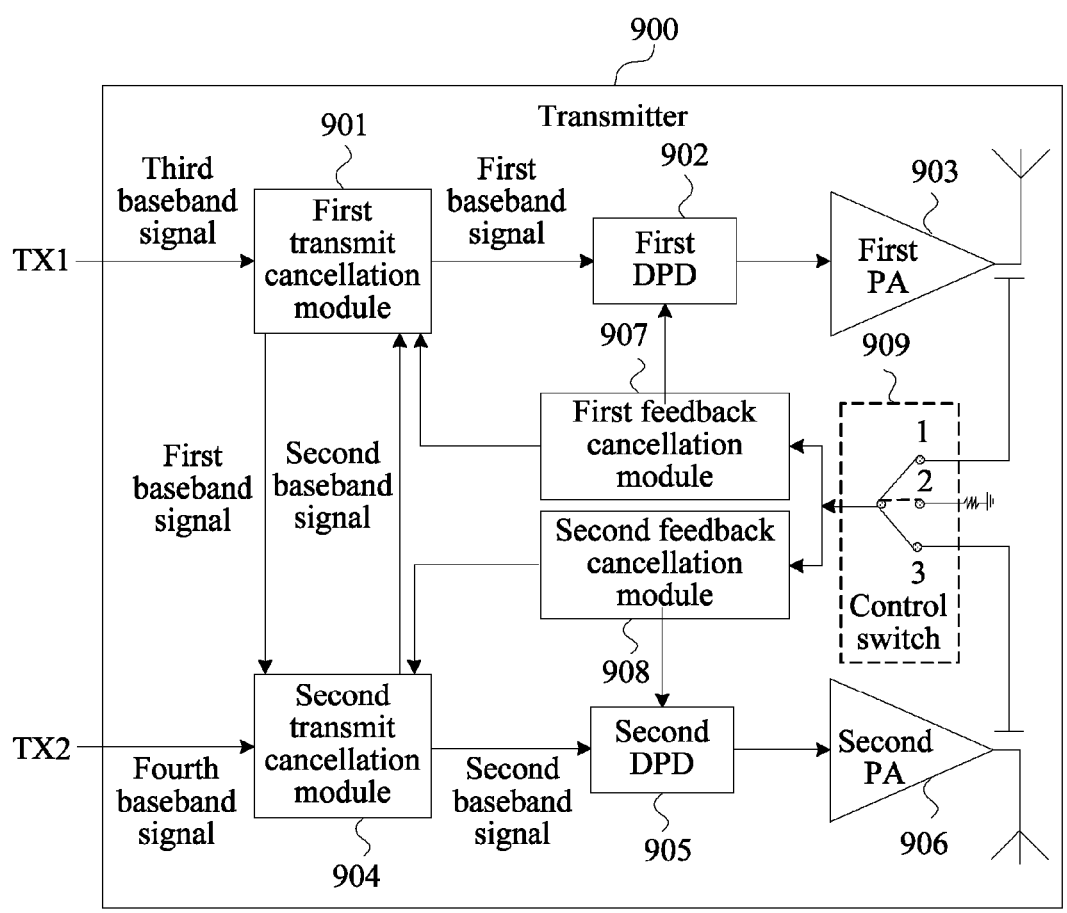
FIG. 9 is a schematic structural diagram of still another transmitter according to Embodiment 7 of the present invention.

This embodiment of the present invention further provides another transmitter and interference cancellation method. Specifically, description is made by using an example in which the transmitter includes two transmit channels and one feedback channel. FIG. 9 is a schematic structural diagram of still another transmitter according to Embodiment 7 of the present invention.

A transmitter 900 shown in FIG. 9 includes a first transmit channel TX1, a second transmit channel TX2 and a feedback channel. A baseband signal of the first transmit channel TX1 includes a first baseband signal and a third baseband signal, and a baseband signal of the second transmit channel TX2 includes a second baseband signal and a fourth baseband signal. The transmitter 900 includes: a first transmit cancellation module 901, a first DPD 902 and a first PA 903. The first transmit cancellation module 901, the first DPD 902 and the first PA 903 are located on the first transmit channel TX1, and are connected in sequence. The transmitter 900 further includes: a second transmit cancellation module 904, a second DPD 905 and a second PA 906. The second transmit cancellation module 904, the second DPD 905 and the second PA 906 are located on the second transmit channel TX2, and are connected in sequence. The feedback channel of the transmitter 900 includes: a first feedback cancellation module 907 and a second feedback cancellation module 908. The transmitter 900 further includes a control switch 909. The first feedback cancellation module 907 is connected to the first transmit cancellation module 901 and the first DPD 902, and the second feedback cancellation module 908 is connected to the second transmit cancellation module 904 and the second DPD 905. The first transmit cancellation module 901 is further connected to the second transmit cancellation module 904, so as to receive a second baseband signal output by the second transmit cancellation module 904. The second transmit cancellation module 904 is further connected to the first transmit cancellation module 901, so as to receive a first baseband signal output by the first transmit cancellation module 901.

The control switch 909 is a single-pole 3-state switch, that is, the switch includes 3 states. If a state of the control switch 909 is a state 1, the first feedback cancellation module 907 is connected to the first PA 903 through the control switch 909; if the state of the control switch 909 is a state 2, the first feedback cancellation module 907 and the second feedback cancellation module 908 may be both grounded or floating by using the control switch 909, and in this case, the feedback channel is in an idle state; and if the state of the control switch 909 is a state 3, the second feedback cancellation module 908 may be connected to the second PA 906 through the control switch 909.

Figure 10:
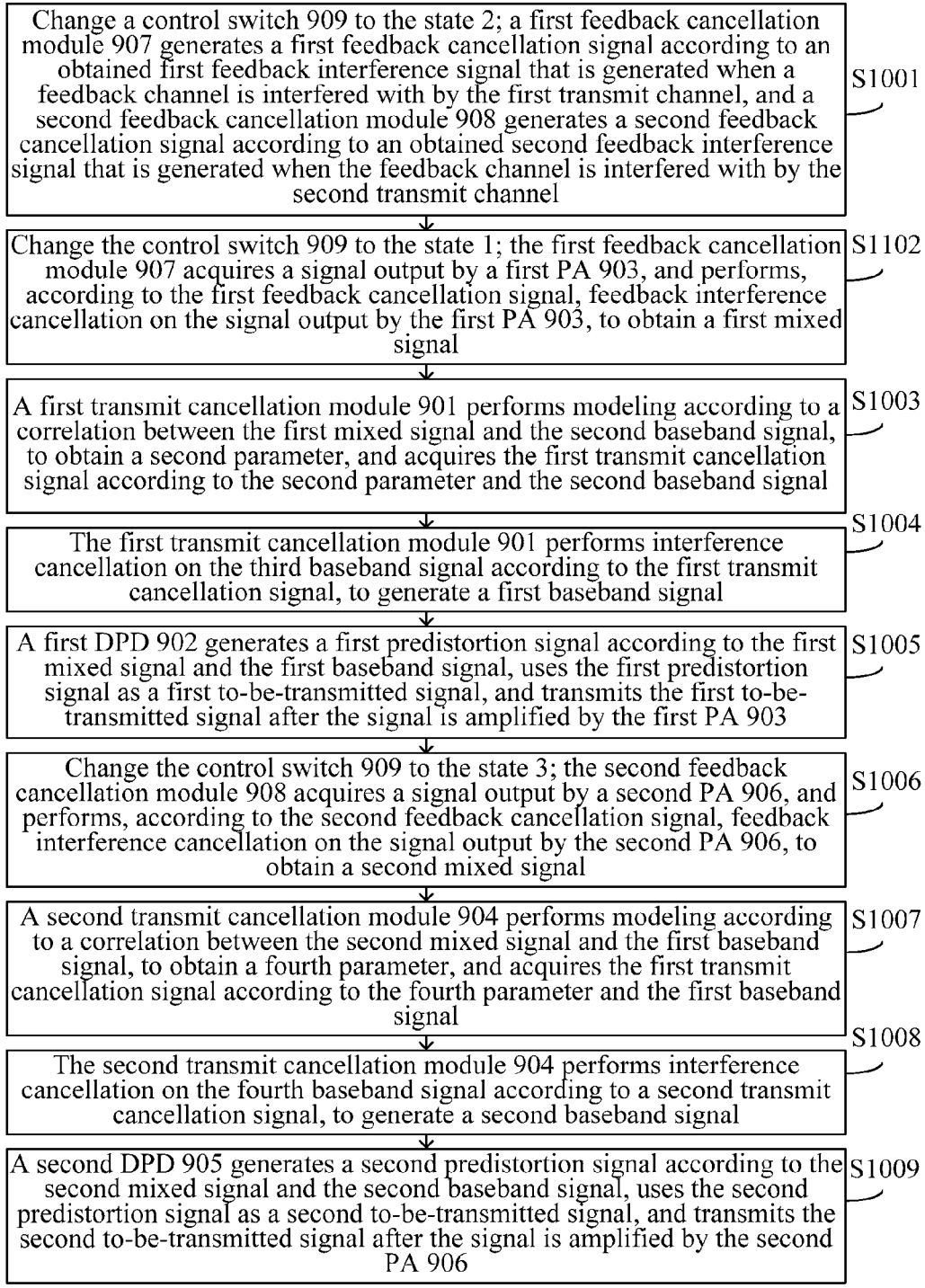
FIG. 10 is a flowchart of still another interference cancellation method according to Embodiment 7 of the present invention.

FIG. 10 is a flowchart of still another interference cancellation method according to Embodiment 7 of the present invention. The method is executed by the transmitter shown in FIG. 9, and includes the following steps:

Step 1001: Change the control switch 909 to the state 2; the first feedback cancellation module 907 generates a first feedback cancellation signal according to an obtained first feedback interference signal that is generated when the feedback channel is interfered with by the first transmit channel, and the second feedback cancellation module 908 generates a second feedback cancellation signal according to an obtained second feedback interference signal that is generated when the feedback channel is interfered with by the second transmit channel.

Specifically, the first feedback cancellation signal may be a signal obtained as follows: the first feedback cancellation module 907 first acquires a first parameter according to a correlation between a predistortion signal that is generated by the first DPD 902 on the first transmit channel according to a baseband signal preceding the first baseband signal on the first transmit channel, and the first feedback interference signal of the feedback channel when the control switch 909 is in the state 2, and then acquires the first feedback cancellation signal according to the first parameter and the predistortion signal that is generated by the first DPD 902 according to a baseband signal preceding the first baseband signal on the first transmit channel. Similarly, the second feedback cancellation signal may be a signal obtained as follows: the second feedback cancellation module 908 acquires a third parameter according to a correlation between a predistortion signal that is generated by the second DPD 905 on the second transmit channel according to a baseband signal preceding the second baseband signal on the second transmit channel, and the second feedback interference signal of the feedback channel when the control switch 909 is in the state 2, and then acquires the second feedback cancellation signal according to the third parameter and the predistortion signal that is generated by the second DPD 905 according to a baseband signal preceding the second baseband signal on the second transmit channel.

The first feedback cancellation signal may also be a signal obtained as follows: the first feedback cancellation module 907 first acquires a first parameter according to a correlation between the first baseband signal of the first transmit channel, and the first feedback interference signal of the feedback channel when the control switch 909 is in the state 2, and then acquires the first feedback cancellation signal according to the first parameter and the first baseband signal. Similarly, the second feedback cancellation signal may also be a signal obtained as follows: the second feedback cancellation module 908 acquires a third parameter according to a correlation between the second baseband signal of the second transmit channel, and the second feedback interference signal of the feedback channel when the control switch 909 is in the state 2, and then acquires the second feedback cancellation signal according to the third parameter and the second baseband signal.

Step 1002: Change the control switch 909 to the state 1; the first feedback cancellation module 907 acquires a signal output by the first PA 903, and performs, according to the first feedback cancellation signal, feedback interference cancellation on the signal output by the first PA 903, to obtain a first mixed signal.

Step 1003: The first transmit cancellation module 901 performs modeling according to a correlation between the first mixed signal and the second baseband signal, to obtain a second parameter, and acquires the first transmit cancellation signal according to the second parameter and the second baseband signal.

Step 1004: The first transmit cancellation module 901 performs interference cancellation on the third baseband signal according to the first transmit cancellation signal, to generate the first baseband signal.

Step 1005: The first DPD 902 generates a first predistortion signal according to the first mixed signal and the first baseband signal, uses the first predistortion signal as a first to-be-transmitted signal, and transmits the first to-be-transmitted signal after the signal is amplified by the first PA 903.

Step 1006: Change the control switch 909 to the state 3; the second feedback cancellation module 908 acquires a signal output by the second PA 906, and performs, according to the second feedback cancellation signal, feedback interference cancellation on the signal output by the second PA 906, to obtain a second mixed signal.

Step 1007: The second transmit cancellation module 904 performs modeling according to a correlation between the second mixed signal and the first baseband signal, to obtain a fourth parameter, and acquires the first transmit cancellation signal according to the fourth parameter and the first baseband signal.

Step 1008: The second transmit cancellation module 904 performs interference cancellation on the fourth baseband signal according to the second transmit cancellation signal, to generate the second baseband signal.

Step 1009: The second DPD 905 generates a second predistortion signal according to the second mixed signal and the second baseband signal, uses the second predistortion signal as a second to-be-transmitted signal, and transmits the second to-be-transmitted signal after the signal is amplified by the second PA 906.

Description is made by using specific examples in this embodiment of the present invention. Beneficial effects thereof are similar to those of the foregoing embodiments, and the details are not provided herein again.

It should be noted that, although this embodiment of the present invention is described by using an example in which a transmitter has two transmit channels and one feedback channel, this embodiment of the present invention is also applicable to a case in which a transmitter includes more than two transmit channels and one feedback channel. The case in which a transmitter includes more than two transmit channels and one feedback channel can be implemented by only adaptively modifying this embodiment of the present invention.

The feedback cancellation module and the transmit cancellation module in any of the embodiments of the present invention may be implemented by an integrated circuit or a chip that integrates functions of corresponding modules, or may be implemented in a manner of combination of a memory and a processor. If the feedback cancellation module and the transmit cancellation module are implemented in the manner of combination of a memory and a processor, the feedback cancellation module and the transmit cancellation module may include at least one memory and processor. The memory may store computer executable instructions that can implement the functions of corresponding modules, so as to be called and executed by a processor connected to the memory.

A person of ordinary skill in the art may understand that all or a part of the steps of the method embodiments may be implemented by a program instructing relevant hardware. The program may be stored in a computer readable storage medium. When the program runs, the steps of the method embodiments are performed. Examples of the foregoing storage medium include: any medium that can store program code, such as a read-only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A transmitter, comprising:
a first digital predistorter (DPD) located on a first transmit channel of the transmitter connected to a power amplifier (PA) located on the first transmit channel of the transmitter;
a first processor located on a feedback channel of the transmitter, wherein the first processor is separately connected to the PA and the first DPD, wherein the first DPD is configured to perform linear predistortion on a baseband signal preceding a first baseband signal on the first transmit channel, to generate a second predistortion signal, and send the second predistortion signal to the first processor;
a control switch, wherein the first processor is connected to the PA through the control switch; and
a first non-transitory computer-readable storage medium including computer-executable instructions executed by the first processor to perform, on the transmitter, operations comprising:
when a status of the control switch is grounded or floating, collecting a feedback interference signal of the feedback channel, acquiring a first parameter according to a correlation between the second predistortion signal sent by the first DPD and the feedback interference signal, and acquiring a feedback cancellation signal according to the first parameter and the second predistortion signal;
performing, according to the feedback cancellation signal, interference cancellation on a signal of the feedback channel, to obtain a first mixed signal;
sending, the first mixed signal to the first DPD, wherein the first DPD is further configured to perform linear predistortion processing according to the first baseband signal on the first transmit channel and the first mixed signal, to generate a first predistortion signal;
amplifying, by the PA, a to-be-transmitted signal; and
then transmitting, by using an antenna, the amplified to-be-transmitted signal, wherein the to-be-transmitted signal is the first predistortion signal or a signal obtained according to the first predistortion signal.

2. The transmitter according to claim 1, wherein the operations performed by the first processor further comprise:
when the status of the control switch indicates that the control switch is connected to the PA, acquiring the signal of the feedback channel, performing, according to the feedback cancellation signal, interference cancellation on the signal of the feedback channel, to obtain the first mixed signal, and sending the first mixed signal to the first DPD.

3. The transmitter according to claim 1, wherein the transmitter further comprises:
a second processor located on the first transmit channel, wherein the first DPD is connected to the PA through the second processor; and
a second non-transitory computer-readable storage medium including computer-executable instructions executed by the second processor to perform, on the transmitter, operations comprising:
performing, according to a first transmit cancellation signal, interference cancellation on the first predistortion signal generated by the first DPD, to obtain the to-be-transmitted signal, wherein the first transmit cancellation signal is a signal obtained according to an interference signal that is generated when the first transmit channel is interfered with one or more transmit channels in the transmitter other than the first transmit channel.

4. The transmitter according to claim 3, further comprising a second DPD located on a second transmit channel of the transmitter; wherein
the second processor is connected to the first processor;
the second DPD is connected to the second processor;
the second transmit channel is any transmit channel other than the first transmit channel in the transmitter;
the operations performed by the first processor further comprise sending the first mixed signal to the second processor;
the second DPD is configured to generate a predistortion signal according to a second baseband signal, and send the predistortion signal to the second processor, wherein the second baseband signal is a baseband signal of the second transmit channel; and
the operations performed by the second processor further comprise: before performing, according to the first transmit cancellation signal, interference cancellation on the first predistortion signal, acquiring a second parameter according to a correlation between the first mixed signal sent by the first processor and the predistortion signal generated by the second DPD, and acquiring the first transmit cancellation signal according to the second parameter and the predistortion signal generated by the second DPD.

5. The transmitter according to claim 1, further comprising:
a second processor located on the first transmit channel, wherein the second processor is connected to the PA through the first DPD; and
a second non-transitory computer-readable storage medium including computer-executable instructions executed by the second processor to perform, on the transmitter, operations comprising:
performing, according to a second transmit cancellation signal, interference cancellation on a third baseband signal on the first transmit channel, to obtain the first baseband signal, and sending the first baseband signal to the first DPD, wherein
the second transmit cancellation signal is a signal obtained according to an interference signal that is generated when the first transmit channel is interfered with one or more transmit channels in the transmitter other than the first transmit channel.

6. The transmitter according to claim 5, wherein
the second processor is connected to the first processor;
the operations performed by the first processor further comprise sending the first mixed signal to the second processor; and
the operations performed by the second processor further comprise: before performing interference cancellation on the third baseband signal, acquiring a third parameter according to a correlation between the first mixed signal sent by a feedback cancellation module and a second baseband signal; and acquiring the second transmit cancellation signal according to the third parameter and the second baseband signal, wherein the second baseband signal is a baseband signal of a second transmit channel in the transmitter; and the second transmit channel is any transmit channel in the transmitter other than the first transmit channel.

7. An interference cancellation method, comprising:
when a feedback channel in a transmitter is connected to a first transmit channel in the transmitter, acquiring a signal of the feedback channel;
when the feedback channel is in an idle state, collecting a feedback interference signal of the feedback channel, and acquiring a first parameter according to a correlation between the feedback interference signal and a second predistortion signal;
acquiring a feedback cancellation signal according to the first parameter and the second predistortion signal, wherein the second predistortion signal is a predistortion signal that is generated by performing linear predistortion on a baseband signal preceding a first baseband signal on the first transmit channel;
performing interference cancellation on the signal of the feedback channel according to the feedback cancellation signal, to obtain a first mixed signal;
performing linear predistortion processing according to the first baseband signal of the first transmit channel and the first mixed signal, to generate a first predistortion signal; and
amplifying a to-be-transmitted signal and then transmitting the amplified to-be-transmitted signal by using an antenna, wherein the to-be-transmitted signal is the first predistortion signal or a signal obtained according to the first predistortion signal.

8. The method according to claim 7, wherein the idle state comprises:
floating or grounded.

9. The method according to claim 7, wherein before the amplifying a to-be-transmitted signal and then transmitting the amplified to-be-transmitted signal by using an antenna, the method further comprises:
performing interference cancellation on the first predistortion signal according to a first transmit cancellation signal, to obtain the to-be-transmitted signal, wherein
the first transmit cancellation signal is a signal obtained according to an interference signal that is generated when the first transmit channel is interfered with a transmit channel in the transmitter other than the first transmit channel.

10. The method according to claim 9, wherein before the performing interference cancellation on the first predistortion signal according to a first transmit cancellation signal, the method further comprises:
acquiring a second parameter according to a correlation between the first mixed signal and a predistortion signal generated in a second transmit channel; and
acquiring the first transmit cancellation signal according to the second parameter and the predistortion signal generated in the second transmit channel, wherein
the second transmit channel is any transmit channel in the transmitter other than the first transmit channel.

11. The method according to claim 7, wherein before the performing linear predistortion processing according to a first baseband signal of the first transmit channel and the first mixed signal, the method further comprises:
performing interference cancellation on a third baseband signal on the first transmit channel according to a second transmit cancellation signal, to obtain the first baseband signal, wherein the second transmit cancellation signal is a signal obtained according to an interference signal that is generated when the first transmit channel is interfered with one or more transmit channels in the transmitter other than the first transmit channel.

12. The method according to claim 11, wherein before the performing interference cancellation on a third baseband signal on the first transmit channel according to a second transmit cancellation signal, the method further comprises:
   acquiring a second parameter according to a correlation between the first mixed signal and a second baseband signal; and
   acquiring the second transmit cancellation signal according to the second parameter and the second baseband signal, wherein
   the second transmit channel is any transmit channel in the transmitter other than the first transmit channel, and the second baseband signal is a baseband signal of the second transmit channel.

* * * * *